Figure 1:
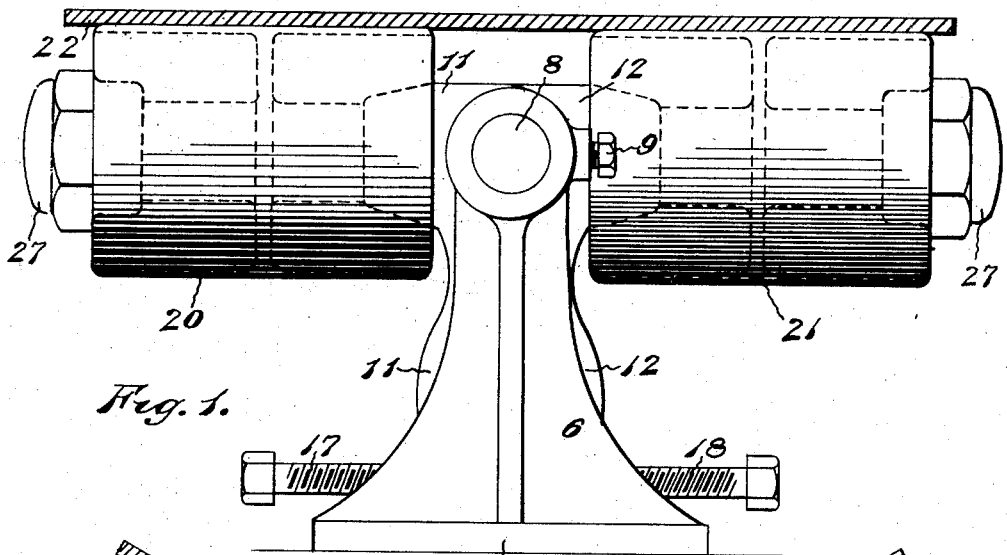

No. 736,905. PATENTED AUG. 18, 1903.
F. R. WILLSON, Jr.
BELT SUPPORTING DEVICE.
APPLICATION FILED AUG. 5, 1901.
NO MODEL. 3 SHEETS—SHEET 1.

Witnesses
Albert E. Williams Jr.
N. Curtis Lammond

Inventor
FREEMAN R. WILLSON, Jr.
By H. H. Bliss
Attorney

No. 736,905. PATENTED AUG. 18, 1903.
F. R. WILLSON, Jr.
BELT SUPPORTING DEVICE.
APPLICATION FILED AUG. 5, 1901.
NO MODEL. 3 SHEETS—SHEET 2.

Witnesses
Albert H. Williams Jr.
N. Curtis Limmont

Inventor
FREEMAN R. WILLSON, JR,
By N. H. Bliss
Attorney

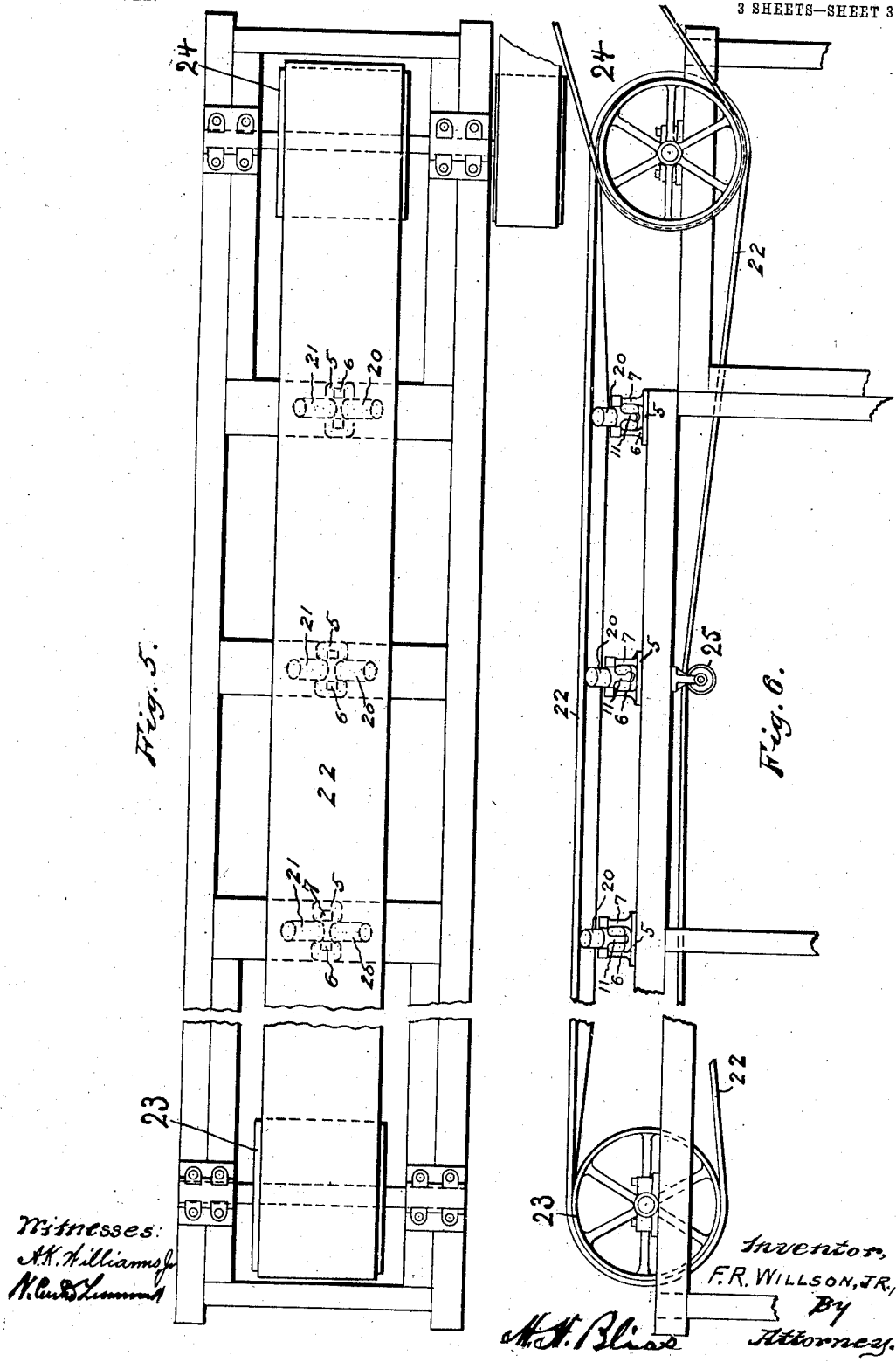

No. 736,905.

Patented August 18, 1903.

UNITED STATES PATENT OFFICE.

FREEMAN R. WILLSON, JR., OF COLUMBUS, OHIO, ASSIGNOR TO JOSEPH A. JEFFREY, OF COLUMBUS, OHIO.

BELT-SUPPORTING DEVICE.

SPECIFICATION forming part of Letters Patent No. 736,905, dated August 18, 1903.

Application filed August 5, 1901. Serial No. 70,995. (No model.)

*To all whom it may concern:*

Be it known that I, FREEMAN R. WILLSON, Jr., a citizen of the United States, residing at Columbus, in the county of Franklin and State of Ohio, have invented certain new and useful Improvements in Belt-Supporting Devices, of which the following is a specification, reference being had therein to the accompanying drawings.

This invention relates to devices for supporting flexible belts at points between the operating-pulleys, more particularly to that class of belts which are caused to assume a trough-like form for conveying material from point to point; and the invention consists in the production of an adjustable device whereby the belt may be supported horizontally or caused to assume a trough-like form, as required.

As many of the devices may be employed between the operating-pulleys as may be required; but for the purpose of illustration I have shown in the drawings one of the devices complete, in which—

Figure 2:
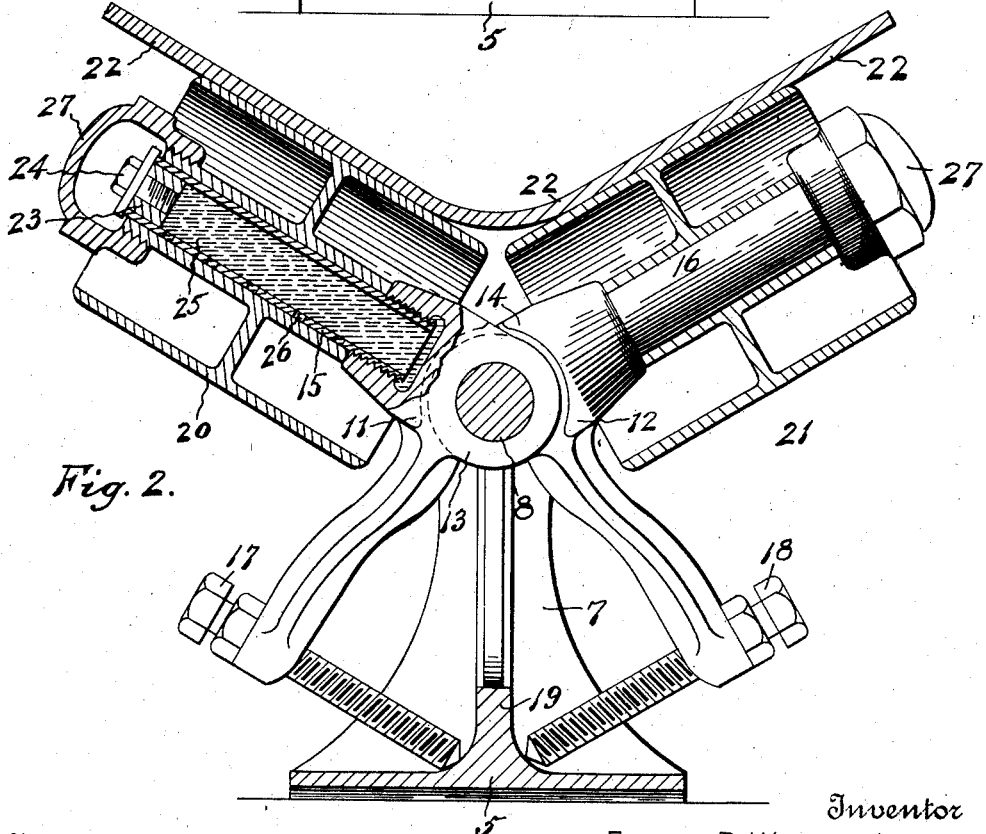
Figure 3:
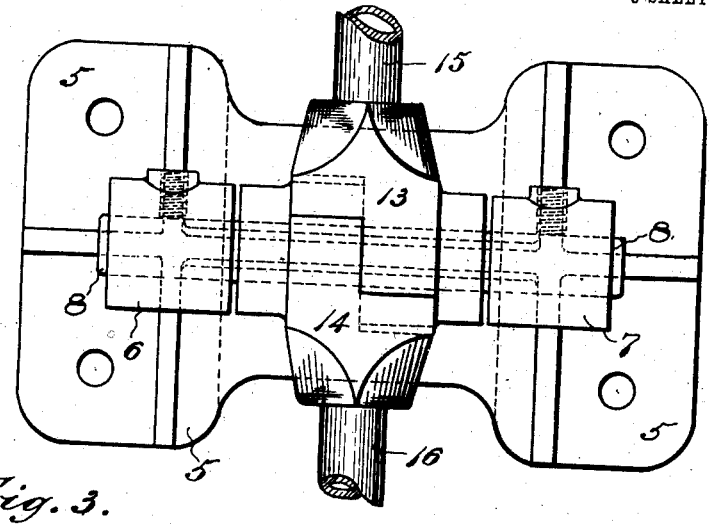
Figure 4:
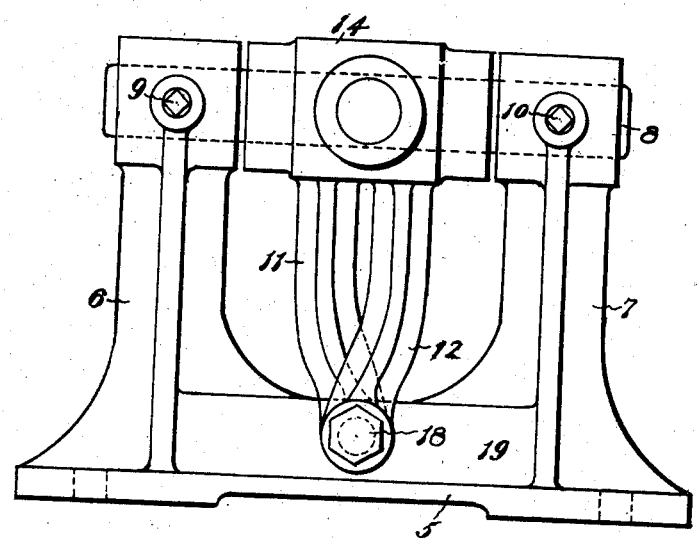

Figure 1 is a side view of the device with the belt in transverse section and the belt and pulleys in horizontal position. Fig. 2 is a sectional side view of the same with the belt and pulleys adjusted to a reversely-inclined position. Fig. 3 is a plan view of the framework with the pulleys removed. Fig. 4 is an end view of the framework with the pulleys removed. Fig. 5 is a plan view of a belt conveyer, of rubber or other suitable material, and of a belt supporting and guiding device embodying my improvements. Fig. 6 is a side elevation.

The supporting-framework consists of a base 5, secured in any suitable manner to a foundation and having standards 6 7 rising therefrom and supporting a transverse shaft 8, the latter preferably held rigidly in the standards, as by set-screws 9 and 10.

Journaled upon the shaft 8, between the hubs of the standards 6 and 7, are two arms 11 and 12, having bosses or hubs 13 14, respectively, in which tubular stub-shafts 15 16 are rigidly secured by being screwed into the hubs 13 14, respectively, as shown in Fig. 2. The lower ends of the arms 11 and 12 are provided with adjusting-screws 17 and 18, engaging the opposite sides of a central rib 19 on the base 5, as shown. By this means the arms 11 and 12, with their attached tubular stub-shafts 15 and 16, may be adjusted to any desired angle, as shown in Fig. 2.

Journaled upon the tubular stub-shafts 15 and 16 are pulleys 20 and 21, uniform in size and adapted when the arms 11 and 12 are adjusted to bring the tubular stub-shafts in horizontal alinement to likewise come into horizontal alinement, as shown in Fig. 1, and thus support the belt 22 in corresponding horizontal position. When thus arranged, the pulleys serve as supports or idler-pulleys to the belt. When it is desired to employ the belt in a trough-like form to serve as a conveyer to carry material from point to point, the pulleys will be adjusted by means of the screws 17 and 18, which will turn the edges of the belt 22 upward, as shown in Fig. 2, and cause it to travel over the pulleys in the form of a trough or conductor, and the degree of inclination of the pulleys may be varied to any required extent to correspondingly increase or decrease the depth of the "trough." As many of the sets of pulleys may be employed as may be required or as the length of the line renders necessary. They may also be of any size or length and adapted to form trough-like belts of any angle or capacity.

Welded or otherwise securely fastened into the outer end of each of the tubular stub-shafts 15 and 16 is a plug 23, and into the center of each plug is tapped a screw-plug 24, as shown in Fig. 2. The interiors of the tubular stub-shafts are intended to be utilized as reservoirs for the lubricating compound, as indicated at 25 in Fig. 2, the lubricant escaping by oil-perforations 26, as shown. By this means a large supply of lubricating compound may be retained in the stub-shafts and fed to the pulley-bearings as fast as required. Thus the perfect, constant, and automatic lubrication of the pulleys is insured.

Guard-caps 27 are screwed over the outer ends of the hubs of the pulleys, as shown, to form dust-guards to the pulley-bearings. The lubricating-reservoirs may thus be recharged while the apparatus is in operation, as the caps 27 and screw-plugs 24 may be detached and reinserted while the apparatus is running.

In Figs. 5 and 6 there is shown a conveyer 22, supported and guided by devices embodying my improvements, it extending from one terminal guiding-drum 23 to another at 24, either of which can receive power from a driving device and transmit it to the conveyer. The conveyer parts proper of these mechanisms are made of any of several materials, such as rubber, canvas, or the like. Generally they are so supported along their operative "run" that the edges shall be held up somewhat above the horizontal plane of the central longitudinal line, as shown in Figs. 2 and 6. When they are used with materials of some sorts or conditions, they can advantageously be tipped up thus at their edges to a greater extent than when they are used with others. If the parts are constructed in the way described, variations in the trough can be made, so as to adapt the mechanisms for these different sorts of work. In some cases relatively large articles are to be carried—such as packages, boxes, or the like—and in such case the belt supporting and guiding devices can be so adjusted that the belt can be held substantially flat horizontally, as shown in Fig. 1. Again, if for any reason either side of the belt should tend to run differently from the other this can be prevented by adjusting properly the guide-roll upon one side independently of the other.

While above I have described in detail the parts of that form of mechanism which I have selected for illustration, it will be understood that the features of invention are not to be limited to such details. Any suitable support instead of the one shown at 6, 7, and 8 can be employed.

In order to provide for having the two edges of the belt supported uniformly and adjustable to corresponding points, I place the two rollers or pulleys directly oppositely to each other, one under one edge portion and the other under the opposite edge portion of the belt, the longitudinal lines of one pulley coinciding with those of the other when they are in horizontal positions, as in Fig. 1, and so that their axes of rotation shall always be in the same vertical planes at right angles to the path of the belt to whatsoever angles of inclination to the horizontal these axes may be adjusted. Consequently I support the two sides of the belt uniformly and avoid the tendency to throw either side into an undulatory position differing from that of the other and also avoid any tendency for the belt to climb in either direction.

I am aware that it has been heretofore proposed to support a belt by means of pulleys or rollers held not by positively-acting locks, stops, or abutments, but by friction-clamps, the rollers being so arranged that each should lie in vertical planes at right angles to the belt different from the vertical planes in which were situated the other rollers, such construction being illustrated in German Patent No. 45,285 of 1888; but the present construction differs in several important respects from those referred to. It is desirable to provide rollers of large circumference and long diameters, and consequently if they are not placed directly opposite to each other, as in my case, there is a considerable distance from the axis of one to the axis of the next, and the two edges of the belt are not uniformly supported, nor are the friction-holders which have been proposed for securing the rollers or pulleys in position after adjustment available for resisting the gravity of the heavy loads to which belt-carriers of this class are subjected, the frictionally-acting clamps yielding under the leverage of the load and causing them to slip. I employ a positively-acting lock, stop, or abutment in contradistinction from friction, which after adjustment of the roller from one angle of inclination to another takes the thrust of the load on the carrier and prevents it from causing any variation in such angle of adjustment. I have found it desirable to employ an arm connected to the roller-shaft either at one end or the other and extended down for some distance, so that I can utilize it to engage with the adjusting devices and also as one element of the positively-acting lock or stop to take the thrust of the load. By turning the screw-rods the adjustment to different angles of inclination is effected, and by turning the lock-nuts or jam-nuts the adjusted parts are locked in their new positions.

I am aware that since the time of my invention it has been proposed to employ two opposite pulleys each having an arm connected to the outer end of the pulley-shaft and extended down to an adjusting and locking device, and while I do not herein specifically claim a pulley mechanism with arms so connected to the outer ends of the shafts I wish it understood that the present invention is not limited to the precise details of construction and arrangement of the arms which I have herein selected for illustration.

I am further aware that oppositely-arranged inclined pulleys under the edge portions of conveyer-belts are not new when broadly considered, they having been heretofore mounted upon rigid axes in inclined positions both in two pulley-supports, as illustrated in my Patent No. 612,939, of October 5, 1898, and in three-pulley constructions, such as shown in Patent No. 571,604 to T. Robins, among others, which illustrate the use of central horizontal pulleys to support the central portion of the belt and inclined pulleys at the ends of the central pulleys to support the edges of the belt, and it will be understood that it is the supports and adjusting devices for the inclined pulleys to which the present improvements relate.

What I claim is—

1. In a mechanism for guiding and supporting a conveyer-belt, pulley-supports adjustably mounted on a common axis longitudinal of the belt, and pulleys on said supports and adapted to have the axes around which they rotate adjusted to either of several inclined positions, substantially as set forth.

2. In a mechanism for supporting and guiding a conveyer-belt, the combination of two oppositely-inclined and vertically-adjustable pulleys, having their axes of rotation in the same vertical plane at right angles to the travel of the belt, and adapted to have said axes adjusted in the said plane to different inclinations to the horizontal, substantially as set forth.

3. In a mechanism for supporting and guiding a conveyer-belt, the combination of two oppositely-inclined pulleys vertically adjustable about a common axis, and having the longitudinal lines of both of said pulleys lying in common vertical planes which are at right angles to the travel of the belt, substantially as set forth.

4. In a supporting and guiding mechanism for a conveyer-belt, pulleys adapted to have their peripheral surfaces in contact with the belt, and shafts for said pulleys adjustable about a common axis longitudinal of the belt to either of several inclinations to the horizontal.

5. The combination with the conveyer-belt of two belt-supporting pulleys having their axes of rotation in the same vertical plane one under each side of the belt and each adjustable independently of the other to either of several positions of different inclinations to the horizontal, substantially as set forth.

6. The combination with the conveyer-belt of two belt-supporting pulleys one under each side of the belt and each adjustable independently of the other about a common axis longitudinal of the belt to either of several positions inclined to the horizontal.

7. The combination of the counterpart pulley-supports vertically adjustable on a common hinge-axis longitudinal of the belt, and the pulleys thereon mounted on axes in the same vertical plane transverse to the said axis, substantially as set forth.

8. In a support and guiding device for a conveyer-belt, the combination of the pulley-supports adjustable on a common axis longitudinal of the belt and each provided with an inclined shaft, and the pulleys respectively mounted on the said shafts, substantially as set forth.

9. A guide and supporting device for a flexible belt having two relatively elongated cylindrical pulleys, in combination with a support for each of said pulleys, mounted on a common hinge-axis and means whereby said supports may be adjusted to regulate the inclination of said pulleys, substantially as set forth.

10. A guide and supporting device for a flexible belt having two relatively elongated cylindrical pulleys, an independent support for each of said pulleys, a central stationary standard, means whereby said pulley-supports are movably connected to said standard, and means whereby the free ends of said pulley-supports are adjusted vertically, about a common axis substantially as set forth.

11. In a guide and supporting device for a flexible belt, a stationary central support, two stub-shafts each movably connected by one end to said central support, a pulley journaled upon each of said stub-shafts, and means for adjusting said stub-shafts to regulate the inclination of said pulleys, substantially as set forth.

12. In a guide and supporting device for a flexible belt, a central shaft, pulley-supports having depending arms and movably engaging said central shaft, pulleys journaled upon said supports, and adjusting means applied to said depending arms whereby the inclination of said pulleys may be regulated, substantially as set forth.

13. In a guide and supporting device for a flexible belt, a supporting base-frame, a longitudinal shaft supported in said base-frame, pulley-supports having depending arms and movably engaging said longitudinal shaft, pulleys journaled upon said supports, and screws supported in said depending arms and engaging said base-frame, whereby said pulley-supports may be adjusted to regulate the inclination of said pulleys, substantially as set forth.

14. In a device for guiding and supporting a belt, the combination of a pivotal support 8, the hubs 13, 14 mounted thereon, the shafts 15, 16 carried by said hubs, means for adjusting the said shafts 15, 16 around the axis at 8, and the belt-supporting pulleys mounted on the said shafts, substantially as set forth.

15. In a supporting device for a conveyer-belt, two pulleys longitudinally opposite to each other and arranged to have their active surfaces lie in horizontal positions and provide for the two edge portions of a belt when flat supports on the same transverse lines at right angles to the belt and having hinges on axes longitudinal of the belt, which hinges are situated between the inner ends of the pulleys, and around which hinges the pulleys while remaining in the same vertical planes transverse to the belt can be adjusted to different angles of inclination to the horizontal, substantially as set forth.

16. In a supporting device for a conveyer-belt, two opposite pulleys for supporting the edge portions of the belt adapted to lie in horizontal planes, and when so lying having a space between their inner ends, and also adapted to be adjusted to different inclinations, their axes always being held in vertical planes at right angles to the path of the belt, shafts for the said pulleys and arms connected to the shafts and extending to points below the pulleys, said arms being adjustable, and means for holding the arms in different positions of adjustment, substantially as set forth.

17. In a supporting device for a conveyer-belt, two opposite pulleys for supporting the edge portions of the belt both lying in the same vertical planes at right angles to the belt, each having a vertically-swinging shaft supported by a hinge at its inner end, and an arm connected to each of said shafts at one end, means below the belt for adjusting the arm, and a positively-acting abutment for holding the shaft and pulley at different angles of adjustment, substantially as set forth.

18. In a mechanism of the class described, the combination with a suitable frame and a conveyer-belt arranged thereon, of a series of supports for the belt, each support having two pulleys arranged to support the edges of said belt, means for adjusting said pulleys to diagonal planes and means for positively locking the same in such positions against downward movement under the strain of the belt, substantially as set forth.

19. In a supporting device for a conveyer-belt, the combination of two pulleys lying in the same vertical planes at right angles to the belt, each pulley having a vertically-swinging shaft, and an adjusting-arm connected to one end of said shaft, and means for adjusting the said arm and the pulley to different positions at different angles of inclination to the horizontal, substantially as set forth.

20. In a supporting device for a conveyer-belt two opposite pulleys for supporting the edge portions of the belt each lying throughout in longitudinal planes of the belt other than the longitudinal planes thereof in which the other lies, and each adapted to have its axis of rotation lie in different inclinations to the horizontal while in a vertical plane at right angles to the lines of the belt, and a positively-acting abutment for holding the pulley in its different angles of adjustment, substantially as set forth.

In testimony whereof I affix my signature in presence of two witnesses.

FREEMAN R. WILLSON, Jr.

Witnesses:
C. D. MILLER,
A. PRICE.